Patented Feb. 12, 1952

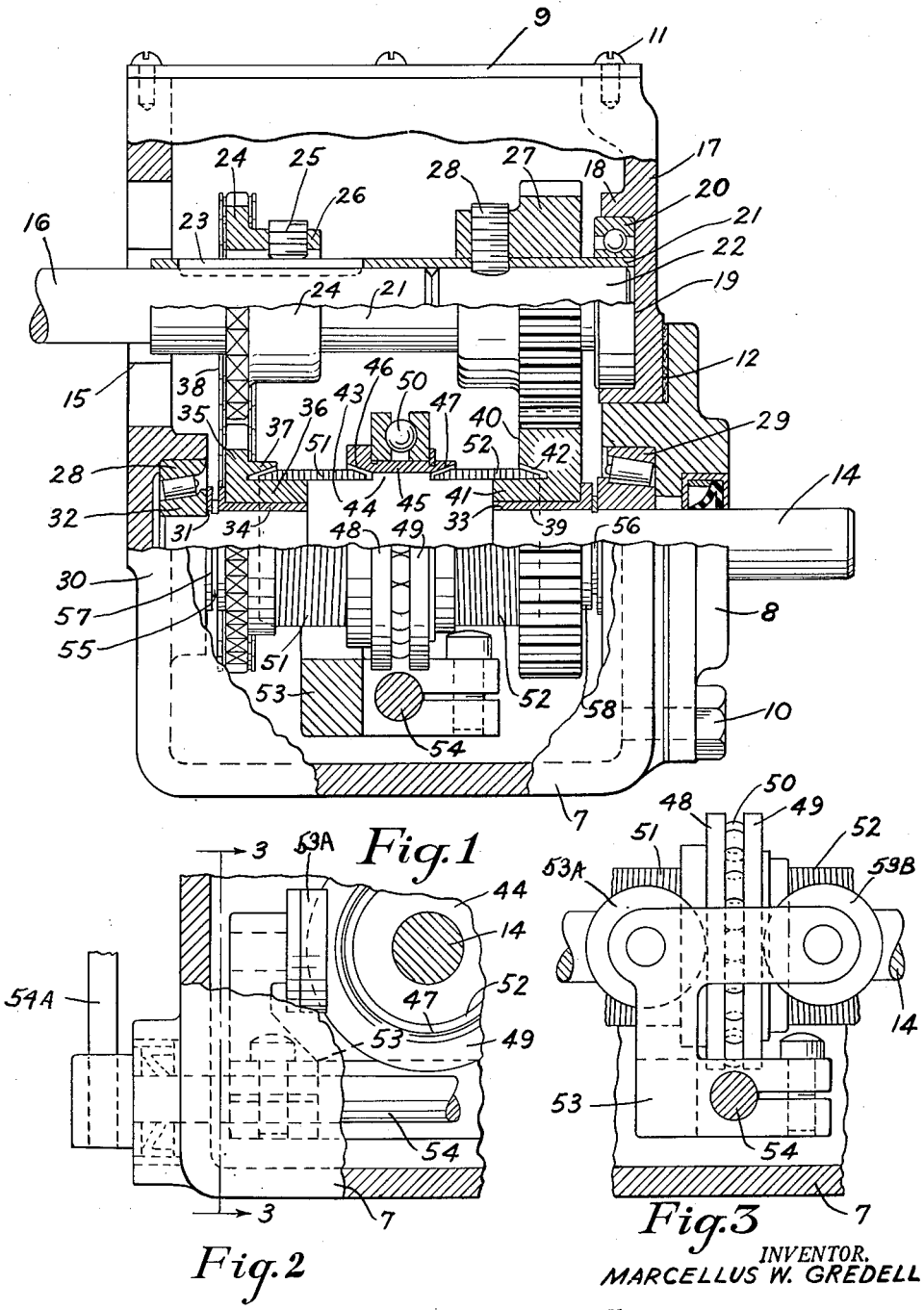

2,585,114

UNITED STATES PATENT OFFICE 2,585,114

POWER TRANSMISSION MECHANISM

Marcellus W. Gredell, Detroit, Mich.

Application April 7, 1948, Serial No. 19,505

7 Claims. (Cl. 74—376)

This invention relates to power transmissions, and has particular reference to devices such as disclosed in my co-pending application S. N. 767,810 filed August 9, 1947, and which was abandoned, of which this application may be considered a continuation in part.

An object of the invention is to generally improve devices of the character indicated, and to provide a stop, reverse and forward drive mechanism, which is simple in construction, economical to manufacture, and efficient in operation.

Another object of the invention is to provide a power transmission unit which may readily be secured to a gasoline engine crank case, whereby the drive shaft of the engine becomes the drive shaft of the transmission and the engine thrust and main bearings serve as corresponding bearings for certain of the driving components of the transmission.

Other objects and advantages of the invention and the description of elements common to both applications are set forth in more complete detail in my co-pending application to which reference is made for greater certainty.

In the accompanying drawing Fig. 1 is an elevational view, with parts broken away and parts in section, of a device embodying the invention.

Fig. 2 is a fragmentary detail, partly in section, and with parts broken away, showing the shifting mechanism.

Fig. 3 is a sectional view taken substantially on the line 3—3 of Fig. 2.

Referring now more particularly to the drawings, it will be understood that in the embodiment herein disclosed, the reference character 7 indicates a housing having an end cover plate 8 and a lighter top closure plate 9, which are respectively secured to the housing 7, by machine screws 10 and 11. The moving parts hereinafter described are all intended to run in a bath of oil, therefore, I provide an oilproof gasket 12 between the housing 7 and cover plate 8, and an oil seal assembly 13 about the driven shaft 14 to prevent the leakage of oil from the housing 7.

The housing 7 is provided with lugs (not shown) whereby it may be bolted to the crank case of a conventional small gasoline engine, such as manufactured by Briggs & Stratton, or the Clinton Manufacturing Co.

The housing 7 is provided at the input side with an opening 15, which is substantially larger than the outside diameter of the drive shaft 16 of the engine to which the transmission is to be mounted, so that the engine drive shaft 16 may extend well into the transmission housing and serve as the driving shaft for the transmission assembly and so that the main bearings and thrust bearings of the engine will serve in the same capacity for the driving components of the transmission assembly.

The side 17 of the casting is provided on its inside with an internal boss 18 which is machined out, as at 19, to accommodate a ball bearing assembly 20 in which is positioned one end of a sleeve 21, which sleeve 21 extends to the opposite side of the casting and into the opening 15. A pilot shaft 22 is positioned in one end of the sleeve 21, and the engine drive shaft 16 is adapted to extend well into the sleeve 21 and contact the end of the pilot shaft 22. Keyed to the sleeve 21 and to the drive shaft 16, as at 23, and adapted to rotate therewith is a sprocket wheel 24. A set screw 25 extends through a bore in the collar 26 of the sprocket wheel, and is adapted to contact the key 23 to hold it in position, and further serves to prevent the axial movement of the sprocket wheel 24.

A gear 27 is also keyed to the sleeve 21 and to the pilot shaft 22, and is in turn held against axial movement on the sleeve by means of a set screw 28. The driven shaft 14 is supported in tapered roller bearing assemblies 28 and 29 which are respectively mounted in recesses formed in the side wall 30 of the casting and the cover plate 8. The taper of the bearing assemblies 28 and 29 serves to absorb the thrust of the driven shaft 14 when the device is in operation, as more particularly described in my co-pending application.

The driven shaft 14 is formed with a shoulder 31 which engages the inner race 32 of the roller assembly 28, and is adapted to impart the backward thrust of the shaft 14 to the bearing assembly 28. The forward thrust is imparted to the bearing assembly 29 through the shoulder 33, and the elements hereinafter described.

Mounted for rotation on a bushing 34 carried by the driven shaft 14 is a sprocket wheel 35 which is formed with a hub portion 36, and an undercut collar portion 37 which serve as clutching elements as hereinafter described. The sprocket wheel 24 and the sprocket wheel 35 are connected by means of a chain 38, and always rotate in the direction indicated by the arrows.

Mounted for rotation on the bushing 39 positioned on the driven shaft 14 is a gear 40, the teeth of which mesh with the teeth of the gear 27, and rotates in the direction opposite to the direction of rotation of the gear 27. The gear 40 has a hub portion 41, and an undercut portion 42 which serve as clutching elements as hereinafter described.

Centrally positioned on the driven shaft is an enlarged section 43 which serves as a clutching element as hereinafter described.

Slidably keyed, as at 44, to the enlarged section 43 of the driven shaft 14 and adapted to rotate therewith is a clutch collar 45 which is provided at either side with undercut angular faces 46 and 47. Mounted concentrically about the collar 45 are the rings 48 and 49 which have annular grooves adapted to accommodate the ball bearings 50. Clutch springs 51 and 52 are loosely mounted about the enlarged area 43 of the shaft 14 and the portions 36 and 41 respectively of the sprocket 35 and the gear 40.

The clutch collar 45 is adapted to be shifted axially on the enlarged portion 43 of the shaft 14 by means of rollers 53A and 53B pivoted to a yoke 53 which is rockable on the shaft 54, the latter being rocked by means of a lever 54A, as is more fully described in my co-pending application to which reference is hereto made for greater certainty.

Locking rings 55 and 56 are adapted to engage suitable grooves formed in the driven shaft 14, and serve to hold the washers 57 and 58 in position.

In operation the device functions as follows:

The sprocket 24 and the gear 27 rotate in the direction indicated by the arrows under the influence of the engine crank shaft 16. The sprocket 35, which is driven by the chain 38 also rotates in the same direction. The gear 40, however, rotates in the reverse direction. Therefore, when the clutch collar 45 is shifted to the left from the position as shown in Fig. 1, the angular face 46 of the clutch collar engages a corresponding face formed on the clutch spring 51 creating a frictional engagement. At the same time the spring 51 is moved to the left so that the opposite end of the spring contacts the undercut face formed on the member 37 of the sprocket 35. After pressure is maintained against the spring 51 it starts to tighten on the clutching element 36 of the sprocket 35, and the enlarged portion 43 of the shaft 14, whereby the direct drive is accomplished.

When the clutch collar 45 is moved to the right from the position as shown in Fig. 1, the clutch spring 52 is forced into engagement with the members 41, 42, and 47, and the enlarged portion 43 of the shaft 14, whereupon the reverse rotation of the gear 40 is imparted to the drive shaft 14, whereby the reverse drive is obtained.

When the clutch collar 45 is in the postion as shown in Fig. 1, the sprockets 24 and 35 and the gears 27 and 40 rotate freely on their respective shafts and the device is in neutral position.

Having described my invention, what I claim and desire to secure by Letters Patent is:

1. A power transmission device comprising the combination of a housing having front and rear walls, an opening in the front wall adapted for the insertion therethrough of an engine crank shaft, a rotatable sleeve mounted at one end in the rear wall of said housing and arranged to engage said crank shaft and rotate therewith, a sprocket and a gear mounted for rotation with said sleeve, a driven shaft having an enlarged section mounted for rotation in said housing and having one end extending beyond the rear wall of said housing, a sprocket wheel and a gear freely rotatable on bushings mounted on said driven shaft said last named sprocket wheel and said gear having clutching elements thereon, a clutch collar concentrically mounted on the enlarged section of said driven shaft, means to shift said clutch collar on said driven shaft, and spring means adapted to contact said clutch collar said enlarged section of said driven shaft and said clutching elements formed on said last named sprocket wheel and gear.

2. A power transmission comprising in combination a housing adapted to be secured to the housing of a conventional power generator, a sleeve mounted for rotation in said first named housing, said sleeve being arranged to engage the drive shaft of said power generator, a sprocket wheel and a gear mounted for rotation with said sleeve, a driven shaft, having an enlarged central area, rotatably mounted in said first named housing, a sprocket wheel freely mounted on a bushing on said driven shaft it being connected by a chain to said first named sprocket wheel, a gear freely mounted for rotation on a bushing on said driven shaft and having its teeth meshed with the teeth of said first named gear said freely mounted sprocket and gear having extensions formed thereon, a clutch collar slidably keyed to the enlarged portion of said driven shaft, and spring members freely mounted concentrically on the enlarged portion of said driven shaft and said extensions formed on said last named sprocket and said last named gear, and means for shifting said clutch collar against said spring members.

3. A power transmission device comprising a housing adapted to be secured to the housing of a conventional power generator, an opening in the wall of said first named housing adapted to accommodate the drive shaft of said power generator, a sleeve in alignment with said opening and supported at one end for rotation in said first named housing, a sprocket wheel and a gear rotatably mounted on said sleeve, a driven shaft mounted for rotation in said first named housing, a sprocket wheel freely mounted for rotation on a bushing on said driven shaft, a chain connecting said sprockets, a gear freely mounted for rotation on a bushing on said driven shaft and in constant mesh with said first named gear, said last named sprocket and said last named gear having clutch means formed thereon, an enlarged area formed on said driven shaft, a clutch collar slidably keyed to said enlarged portion and having clutching elements formed thereon, and spring members concentrically mounted on opposite sides of said clutch collar and about the enlarged portion of said driven shaft and arranged to contact the clutch means formed on said sprocket and said gear.

4. A power transmission device comprising in combination a housing, means for securing said housing to a power generator having a drive shaft, an opening in one wall of said housing adapted to accommodate the drive shaft of said power generator, a rotatable sleeve in said housing keyed to said drive shaft, a sprocket wheel and a gear keyed to said sleeve, a driven shaft mounted for rotation in said housing and having an enlarged portion centrally positioned in said housing, a sprocket wheel freely mounted on a bushing on said driven shaft at one side of said enlarged area and adapted to be driven by said first named sprocket wheel, clutch means formed on said sprocket wheel including a collar having a diameter substantially the same as the diameter of the enlarged portion of said driven shaft, a gear mounted for rotation on a bushing on said driven shaft at the opposite side of said enlarged portion and having a collar of the diameter substantially the same as the diameter of said enlarged portion of said driven shaft, a clutch collar slidably keyed to the enlarged portion of said driven shaft, means for shifting said clutch collar, and spring means positioned on opposite sides of said clutch collar and adapted to contact the said clutch collar and the large portion of said driven shaft and the respective collars of said last named sprocket and said last named gear.

5. The combination defined in claim 2, including rollers positioned at opposite sides of said clutch collar, said rollers being pivoted to a yoke, the latter being rockable by a lever positioned on the exterior of said housing.

6. The combination defined in claim 4, in which said clutch collar is undercut at either side to provide clutch faces arranged to be contacted by said spring means, and said clutch collar is also provided with a pair of concentric rotatable rings having ball bearings therebetween.

7. The combination defined in claim 4, in which the sprocket and the gear mounted for rotation on said driven shaft are provided with undercut faces arranged to be contacted by the said spring means.

MARCELLUS W. GREDELL.

REFERENCES CITED

The following references are of record in the file of this patent:

UNITED STATES PATENTS

| Number | Name | Date |
|---|---|---|
| 2,101,515 | Schmitter | Dec. 7, 1937 |
| 2,235,266 | Starkey | Mar. 18, 1941 |
| 2,314,549 | Milbrath | Mar. 23, 1943 |

FOREIGN PATENTS

| Number | Country | Date |
|---|---|---|
| 740,132 | France | Jan. 21, 1933 |